(12) United States Patent
Liu et al.

(10) Patent No.: US 11,489,925 B2
(45) Date of Patent: Nov. 1, 2022

(54) INFORMATION INTERACTION METHODS, APPARATUSES, DEVICES, AND SYSTEMS AND STORAGE MEDIA

(71) Applicant: SENSETIME INTERNATIONAL PTE. LTD., Singapore (SG)

(72) Inventors: Zuxi Liu, Singapore (SG); Zhenyu Lei, Singapore (SG); Shengping Cui, Singapore (SG); Shuai Zhang, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 17/364,045

(22) Filed: Jun. 30, 2021

(65) Prior Publication Data

US 2022/0210248 A1 Jun. 30, 2022

Related U.S. Application Data

(63) Continuation of application No. PCT/IB2021/055655, filed on Jun. 25, 2021.

(30) Foreign Application Priority Data

Dec. 31, 2020 (SG) .......................... 10202013256W

(51) Int. Cl.
*G06F 15/173* (2006.01)
*H04L 67/133* (2022.01)
(Continued)

(52) U.S. Cl.
CPC .......... *H04L 67/133* (2022.05); *H04L 67/146* (2013.01); *H04L 67/55* (2022.05)

(58) Field of Classification Search
CPC ........ H04L 67/40; H04L 67/146; H04L 67/26
(Continued)

(56) References Cited

U.S. PATENT DOCUMENTS 8,370,862 B1 * 2/2013 Joyce ..................... G06F 9/547
719/330
8,505,038 B2 * 8/2013 Lakshmanan ........... G06F 9/544
719/330

(Continued)

FOREIGN PATENT DOCUMENTS

CN 109639636 4/2019
CN 112055851 12/2020

OTHER PUBLICATIONS

SG Office Action issued in Singapore Appln. No.10202013256W, dated Jun. 23, 2021, 9 pages.

(Continued)

*Primary Examiner* — Liang Che A Wang
(74) *Attorney, Agent, or Firm* — Fish & Richardson P.C.

(57) ABSTRACT

The present disclosure provides information interaction methods, apparatuses, systems, and devices, storage media and computer programs. The method includes: publishing a remote procedure call, RPC, message to a service-side; and in response to detecting that a response message with respect to the RPC message exists on the service-side, obtaining the response message, where the response message is published to the service-side by a called device indicated in the RPC message, and the response message is acquired by the called device processing the RPC message after detecting the RPC message at the service-side.

16 Claims, 7 Drawing Sheets

(51) Int. Cl.
   *H04L 67/55* (2022.01)
   *H04L 67/146* (2022.01)
(58) Field of Classification Search
   USPC .................................. 709/217, 219, 223, 230
   See application file for complete search history.

(56) References Cited

U.S. PATENT DOCUMENTS

| | | | | |
|---|---|---|---|---|
| 2004/0255048 | A1* | 12/2004 | Lev Ran | G06F 16/9574 |
| | | | | 709/249 |
| 2009/0193443 | A1* | 7/2009 | Lakshmanan | G06F 9/544 |
| | | | | 719/330 |
| 2009/0300743 | A1* | 12/2009 | Ma | G06F 21/31 |
| | | | | 726/6 |
| 2012/0117511 | A1* | 5/2012 | Agnihotri | H04N 21/47 |
| | | | | 715/810 |
| 2021/0165701 | A1* | 6/2021 | Fujino | H04L 67/025 |

OTHER PUBLICATIONS

PCT International Search Report in International Appln. No. PCT/IB2021/055655, dated Oct. 13, 2021, 3 pages.

PCT International Written Opinion in International Appln. No. PCT/IB2021/055655, dated Oct. 13, 2021, 4 pages.

* cited by examiner

INFORMATION INTERACTION METHODS, APPARATUSES, DEVICES, AND SYSTEMS AND STORAGE MEDIA

CROSS REFERENCE TO RELATED APPLICATION

This application is a continuation of International Application No. PCT/IB2021/055655, filed on Jun. 25, 2021, which claims priority to Singaporean Patent Application No. 10202013256W entitled "INFORMATION INTERACTION METHODS, APPARATUSES, DEVICES, AND SYSTEMS AND STORAGE MEDIA" and filed on Dec. 31, 2020, which is incorporated herein by reference in its entirety.

TECHNICAL FIELD

The present disclosure relates to the field of Internet of Things, in particular to information interaction methods, apparatuses, devices, and systems, storage media and computer programs.

BACKGROUND

Internet of Things (IoT) refers to a network where everything is connected, which is an extended and expanded network based on the Internet. The IoT is a huge network formed by combining various information sensing devices with the Internet to realize the interconnection of people, machines, and things at any time and any place.

However, in the IoT scenario, due to the complex network environment, there may be situations where information cannot be directly interacted between different devices.

SUMMARY

The present disclosure provides information interaction methods, apparatus, devices and systems, and storage media.

According to a first aspect of the embodiments of the present disclosure, an information interaction method is provided. The method includes: publishing a remote procedure call, RPC, message to a service-side; and in response to detecting that a response message with respect to the RPC message exists on the service-side, obtaining the response message, where the response message is published to the service-side by a called device indicated in the RPC message, and the response message is acquired by the called device processing the RPC message after detecting the RPC message at the service-side.

In some optional embodiments, the method further includes: adding a message identifier of the RPC message at a first designated position in the RPC message; and publishing the RPC message to the service-side includes: publishing the RPC message with the message identifier added to the service-side.

In some optional embodiments, the method further includes: in response to detecting that a new message exists in a second predetermined message path of the service-side, and the new message has the message identifier of the RPC message, determining that the detected new message is the response message with respect to the RPC message.

In some optional embodiments, the response message is published to the service-side by the called device based on a preset asynchronous messaging protocol: and/or publishing the RPC message to the service-side includes, publishing the RPC message to the service-side based on the preset asynchronous messaging protocol.

In some optional embodiments, publishing the RPC message to the service-side includes: publishing the RPC message to a first predetermined message path of the service-side; and obtaining the response message in response to detecting that the response message with respect to the RPC message exists on the service-side includes: in response to detecting that the response message with respect to the RPC message exists in a second predetermined message path of the service-side, obtaining the response message.

In some optional embodiments, the first predetermined message path of the service-side and/or the second predetermined message path of the service-side includes identification information of a device published the RPC message.

In some optional embodiments, the RPC message instructs the called device to execute a remote control command, and the response message indicates an execution result acquired by the called device executing the remote control command; or the RPC message instructs the called device to perform vision task processing, and the response message indicates a processing result acquired by the called device performing the vision task processing.

In some optional embodiments, the method further includes: obtaining a pre-processing result acquired by pre-processing an image; and generating an RPC message including the pre-processing result.

According to a second aspect of the embodiments of the present disclosure, an information interaction method is provided. The method includes: in response to that a called device detects a preset RPC message existing on a service-side, obtaining the preset RPC message, where the preset RPC message includes information indicating the called device; acquiring a response message with respect to the preset RPC message by processing the preset RPC message; and publishing the response message to the service-side.

In some optional embodiments, the method further includes: in response to that the called device detects a new message existing in a first predetermined message path of the service-side, determining that the detected new message is the preset RPC message; and/or publishing the response message to the service-side includes: publishing the response message to a second predetermined message path of the service-side.

In some optional embodiments, the preset RPC message includes a message identifier of the preset RPC message; the method further includes: adding the message identifier of the preset RPC message at a second designated position of the response message; and publishing the response message to the service-side includes: publishing the response message with the message identifier added to the service-side.

In some optional embodiments, the preset RPC message is published by an RPC initiating device to the service-side based on a preset asynchronous messaging protocol; and/or publishing the response message to the service-side includes: publishing the response message to the service-side based on the preset asynchronous messaging protocol.

In some optional embodiments, a first predetermined message path of the service-side and/or a second predetermined message path of the service-side includes identification information of an RPC initiating device published the RPC message; and/or the preset RPC message instructs the called device to execute a remote control command or perform vision task processing.

According to a third aspect of the embodiments of the present disclosure, an information interaction method is provided. The method includes: receiving an RPC message published by an RPC initiating device; sending the RPC message to a called device indicated in the RPC message; receiving a response message with respect to the RPC message published by the called device, where the response message is acquired by the called device after the called device detects the RPC message at the service-side and processes the RPC message; and sending the response message to the RPC initiating device.

In some optional embodiments, receiving the RPC message published by the RPC initiating device includes: receiving the RPC message published by the RPC initiating device to a first predetermined message path; and receiving the response message with respect to the RPC message published by the called device includes: receiving the response message published by the called device to a second predetermined message path.

In some optional embodiments, receiving the RPC message published by the RPC initiating device includes: receiving the RPC message published by the RPC initiating device based on a preset asynchronous messaging protocol; and receiving the response message with respect to the RPC message published by the called device includes: receiving the response message published by the called device based on the preset asynchronous messaging protocol.

In some optional embodiments, the first predetermined message path and/or the second predetermined message path includes identification information of a device published the RPC message.

According to a fourth aspect of the embodiments of the present disclosure, an information interaction apparatus is provided. The apparatus includes: an RPC message publishing module configured to publish an RPC message to a service-side; and a response message obtaining module configured to obtain a response message with respect to the RPC message in response to detecting that the response message exists on the service-side, where the response message is published to the service-side by a called device indicated in the RPC message, and the response message is acquired by the called device processing the RPC message after detecting the RPC message at the service-side.

According to a fifth aspect of the embodiments of the present disclosure, an information interaction apparatus is provided. The apparatus includes: an RPC message obtaining module configured to obtain a preset RPC message in response to detecting the preset RPC message existing on a service-side, where the preset RPC message includes information indicating the called device; a processing module configured to acquire a response message with respect to the preset RPC message by processing the preset RPC message; and a response message publishing module configured to publish the response message to the service-side.

According to a sixth aspect of the embodiments of the present disclosure, an information interaction apparatus is provided. The apparatus includes: an RPC message receiving module configured to receive an RPC message published by an RPC initiating device; an RPC message sending module configured to send the RPC message to a called device indicated in the RPC message; a response message receiving module configured to receive a response message with respect to the RPC message published by the called device, where the response message is acquired by the called device after the called device detects the RPC message at the service-side and processes the RPC message; and a response message sending module configured to send the response message to the RPC initiating device.

According to a seventh aspect of the embodiments of the present disclosure, an information interaction system is provided. The system includes: an RPC initiating device connected to a service-side through a first network and configured to publish an RPC message to the service-side, and in response to detecting that a response message with respect to the RPC message exists on the service-side, obtain the response message; a called device connected to the service-side through a second network, and configured to obtain a preset RPC message in response to detecting the preset RPC message existing on the service-side, where the preset RPC message includes information indicating the called device, acquire a response message with respect to the preset RPC message by processing the preset RPC message, and publish the response message to the service-side; and the service-side connected to the RPC initiating device through the first network, connected to the called device through the second network, and configured to receive the RPC message published by the RPC initiating device, send the RPC message to the called device indicated in the RPC message, receive the response message published by the called device, and send the response message to the RPC initiating device.

According to an eighth aspect of the embodiments of the present disclosure, a computer-readable storage medium is provided, the storage medium stores a computer program, and the computer program is configured to execute the information interaction method according to any one of the first aspect, the second aspect, or the third aspect.

According to a ninth aspect of the embodiments of the present disclosure, an information interaction device is provided. The device includes: a processor, and a memory for storing instructions executable by the processor; where the processor is configured to invoke the instructions stored in the memory to implement the information interaction method according to any one of the first aspect, the second aspect, or the third aspect.

According to a tenth aspect of the embodiments of the present disclosure, a computer program is provided, the computer program includes computer-readable codes which, when executed in an electronic device, cause a processor in the electronic device to perform the information interaction method according to any one of the first aspect, the second aspect, or the third aspect.

Embodiments of the present disclosure provide technical solutions that may include the following beneficial effects. In the embodiments of the present disclosure, an RPC message can be published to a service-side, and a response message with respect to the RPC message can be obtained upon detecting that the response message with respect to the RPC message exists on the service-side. The response message is published to the service-side by a called device indicated in the RPC message, and the response message is generated by the called device processing the RPC message after detecting the RPC message at the service-side. When the RPC initiating device and the called device cannot directly communicate with each other, the method realizes a purpose of synchronous remote procedure call between devices, and satisfies a demand of service collaboration between devices.

It should be understood that the above general description and the following detailed description are merely exemplary and explanatory and do not limit the disclosure.

BRIEF DESCRIPTION OF THE DRAWINGS

The accompanying drawings herein are incorporated in and constitute a part of this specification, illustrate embodi

DETAILED DESCRIPTION OF THE EMBODIMENTS

Figure 1:
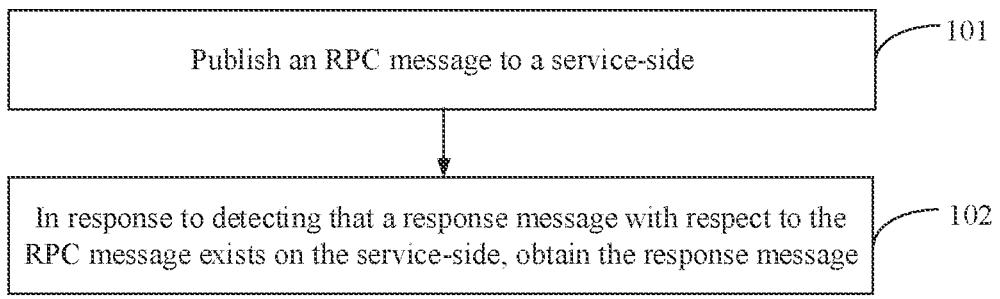
- FIG. 1 is a flowchart illustrating an information interaction method according to an exemplary embodiment of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third." and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the word "if" as used herein may be interpreted as "when" or "upon" or "in response to determining".

The embodiments of the present disclosure provide an information interaction scheme that can meet the need for real-time service collaboration of information between devices when direct communication between devices is not possible.

As shown in FIG. 1, which illustrates an information interaction method according to an exemplary embodiment. The method can be used for a Remote Procedure Call (RPC) initiating device, where the RPC initiating device is a device that initiates an RPC request to a service-side. The information interaction method provided by the present disclosure may include the following steps.

At step 101, an RPC message is published to a service-side.

RPC refers to a computer communication technology, which allows a program running on a first computer to invoke a function, a program, an instruction, etc. from another address space (usually a second computer on an open network), so as to acquire a result that the first computer wants to obtain.

In the embodiments of the present disclosure, the RPC initiating device (such as the first computer) issues the RPC message to the service-side, and can subsequently obtain from the service-side a response message, which is generated by an other device (such as the second computer) processing the RPC message. The other device includes the called device indicated in the RPC message. The service-side itself does not process the procedure (such as a function) involved in the RPC message. The service-side is similar to a message intermediate platform that can receive, store, and send various messages.

At step 102, in response to detecting that a response message with respect to the RPC message exists on the service-side, the response message is obtained.

In the embodiments of the present disclosure, the response message is published to the service-side by a called device indicated in the RPC message, and the response message is acquired by the called device processing the RPC message after detecting the RPC message at the service-side. After sending the RPC message to the service-side, the RPC initiating device can monitor the response message at the service-side in real-time while network connection to the service-side is available. In response to detecting a presence of the response message at the service-side, the RPC initiating device can obtain the response message in real-time.

Through the above method, it is possible that the RPC initiating device can obtain the response message with respect to the RPC message from the service-side in real-time in a case where the RPC initiating device and the called device cannot communicate directly. Thus, the real-time remote procedure interaction between devices is realized, the need for real-time service collaboration between devices is meet. For example, for the IoT, different devices may need to work together, but these devices may not be able to connect to each other due to specific network environment settings, actual network connection capabilities of the devices, etc. In this case, using the method provided by the present disclosure, it is possible to satisfy the synchronous invoking between different devices in a cross-network situation, that is, the RPC initiating device and the service-side are in one network while the called device and the service-side are in another network.

Figure 2:
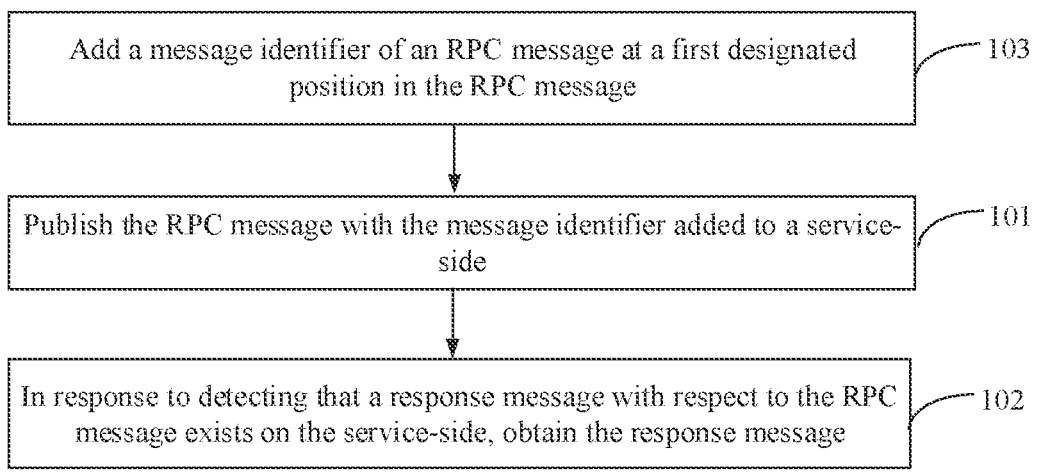
FIG. 2 is a flowchart illustrating an information interaction method according to another exemplary embodiment of the present disclosure.

In some optional embodiments, as shown in FIG. 2, the method may further include step 103.

At step 103, at a first designated position in the RPC message, a message identifier of the RPC message is added.

In the embodiments of the present disclosure, step 103 may be performed prior to step 101. The first designated position includes, but is not limited to, a position of the header of the RPC message.

In an example, there may be one or more RPC messages issued by the RPC initiating device, and different RPC messages have different message identifiers, so as to distinguish different RPC messages. And the message identifier of each RPC message can belong to a same monotonically increasing sequence. The monotonically increasing sequence can start from any value and increase sequentially.

For example, the monotonically increasing sequence starts from 0, and the number of increments is 1 each time, then the message identifier of each RPC message also starts from 0. Each time there is a new RPC message, the message identifier of the new RPC message is incremented by 1 sequentially.

Correspondingly, step 101 may include that the RPC message with the message identifier added is published to the service-side.

In the embodiments of the present disclosure, the RPC initiating device publishes the RPC message with the message identifier added to the service-side, and the called device can then determine which RPC message the called device processes based on the message identifier.

In the embodiment, the message identifier of the RPC message can be added at the first designated position of the RPC message, such that the response message with respect to the RPC message can be determined subsequently based on the message identifier of the RPC message, thereby improving the availability of the RPC.

Figure 3:
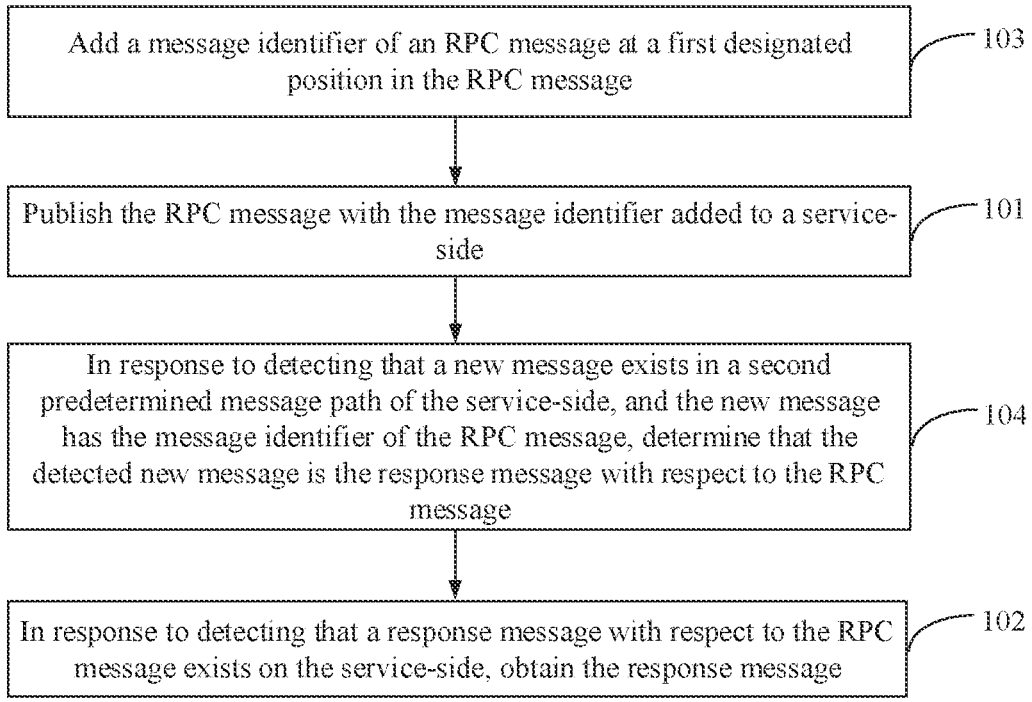
FIG. 3 is a flowchart illustrating an information interaction method according to still another exemplary embodiment of the present disclosure.

In some optional embodiments, as shown in FIG. 3, the method may further include step 104.

At step 104, in response to detecting that a new message exists in a second predetermined message path of the service-side, and the new message has the message identifier of the RPC message, it is determined that the detected new message is a response message with respect to the RPC message.

In the embodiments of the present disclosure, the second predetermined message path is a predetermined path used by the service-side to store the response message corresponding to the RPC message published by the RPC initiating device.

Since the RPC initiating device previously added the message identifier of the RPC message to the RPC message, then the RPC initiating device can determine that a new message is a response message with respect to the previously published RPC message if the RPC initiating device detects the presence of the new message in the second predetermined message path of the service-side and the message identifier of the RPC message is also added to the new message.

For example, before publishing an RPC message such as msg X, the RPC initiating device adds message identifier 1 to a header of msg X, and the RPC initiating device publishes msg X with message identifier 1 added to the service-side. If the RPC initiating device subsequently detects at the service-side a message such as msg Y issued by the called device, and msg Y also has message identifier 1 of the RPC message, the RPC initiating device can determine that msg Y is the response message corresponding to msg X.

In the embodiment, after sending an RPC message, the RPC initiating device can determine that a new message detected on the service-side is a response message corresponding to the RPC message based on a message identifier of the RPC message. Thus, the RPC initiating device obtains the response message from the called device with high accuracy when direct communication between the RPC initiating device and the called device is not possible.

In some optional embodiments, the response message is published to the service-side by the called device based on a preset asynchronous messaging protocol.

In an example, the preset asynchronous messaging protocol may include but is not limited to a Message Queuing Telemetry Transport (MQTT) protocol. The MQTT protocol is a Publish/Subscribe paradigm-based messaging protocol under an International Organization for Standardization (ISO) standard. The MQTT protocol is a publish/subscribe messaging protocol designed for poor network conditions and remote devices with low hardware performance. That is, a remote device can publish its own messages to the service-side, and can also subscribe to messages on the service-side which are published by other devices.

In the embodiment of the present disclosure, after getting the response message with respect to the RPC message, the called device can publish the response message to the service-side based on the MQTT protocol using a message publishing manner, such that the RPC initiating device can get the response message from the service-side.

Similarly, for the above step 101, the RPC initiating device can also publish an RPC message to the service-side based on the preset asynchronous messaging protocol. In an example, the RPC initiating device can publish the RPC message to the service-side based on the MQTT protocol using a message publishing manner.

In the embodiments, the RPC initiating device can publish the RPC message based on the preset asynchronous messaging protocol, and the called device can also publish the response message to the service-side based on the preset asynchronous messaging protocol, thereby realizing RPC synchronous invocation based on the asynchronous messages. In the case of unreachable network between devices, if an existing asynchronous message communication method is adopted, there may be a situation that an RPC message published by a device cannot be obtained by another device, and a successful response to the service collaboration demand between devices cannot be obtained by the device. However, in the embodiment, after publishing the RPC message, the RPC initiating device receives the response message returned by the called device, thereby realizing the RPC synchronous scheduling based on asynchronous messages. The called device can monitor the service-side in real-time, and after the RPC initiating device publishes the RPC message to the service-side, the called device can detect the RPC message. Furthermore, the called device can obtain the RPC message, process it, and return a response message. Similarly, the RPC initiating device can also monitor the service-side, and after the called device publishes the response message to the service-side, the RPC initiating device can detect the response message with respect to the RPC message, which realizes a purpose of synchronous remote procedure call between devices and satisfies a demand of reliable service collaboration between devices.

In some optional embodiments, when publishing the RPC message to the service-side, the RPC initiating device may publish the RPC message to a first predetermined message path of the service-side. The first predetermined message path is a predetermined path used by the service-side to store the RPC message published by the RPC initiating device.

Correspondingly, the RPC initiating device may obtain the response message when the RPC initiating device detects that the response message with respect to the RPC message exists in the second predetermined message path of the service-side. The second predetermined message path is a predetermined path used by the service-side to store the response message corresponding to the RPC message published by the RPC initiating device.

In the embodiments of the present disclosure, both the RPC initiating device and the called device adopt a publish/subscribe mode for message publishing and for obtaining a desired message. Specifically, the RPC initiating device publishes the RPC message to the first predetermined message path of the service-side, monitors the second predetermined message path of the service-side, and obtains the response message with respect to the RPC message from the second predetermined message path. The called device monitors the first predetermined message path of the service-side, and obtains the RPC message from the first predetermined message path. After processing the RPC message and obtaining the response message, the called device publishes the response message to the second predetermined message path of the service-side. In other words, the first predetermined message path and the second predetermined message path of the service-side appear in pairs. Different devices can subscribe to message paths of the messages they need in advance, such as an RPC message or a response message. The service-side allocates the corresponding message path to each device according to the subscription. When detecting a new message in the corresponding message path, each device can get the message from the corresponding message path, and can publish the message that needs to be published to the specified message path, so that each device can get the message the device itself needs in time.

In an example, based on a publish/subscribe mechanism, the RPC initiating device subscribes to a second topic, and the RPC initiating device publishes an RPC message to the service-side with a first topic; and the called device subscribes to a message with the first topic, and the called device publishes a response message corresponding to the RPC message to the service-side with the second topic. Exemplarily, the first topic may be set as an identification of the first predetermined message path, and the second topic may be set as an identification of the second predetermined message path.

In an example, the first predetermined message path and/or the second predetermined message path of the service-side includes identification information of a device published the RPC message, such that the RPC initiating device and the called device can publish messages.

For example, the first predetermined message path of the service-side may be /rpc/device/{A}/request, and the first predetermined message path can be used to store RPC messages issued by the RPC initiating device, where (A) denotes a unique device identifier of the RPC initiating device, which may include, but is not limited to, a unique serial number of the RPC initiating device hardware. The RPC messages published by the RPC initiating device are all stored in the first predetermined message path, /rpc/device/{A}/request, of the service-side.

Similarly, the second predetermined message path of the service-side may be /rpc/device/{A}/response, and the second predetermined message path can be used to store the response messages with respect to the RPC messages issued by the called device, where {A} also denotes the unique device identifier of the RPC initiating device, which may include, but is not limited to, the unique serial number of the RPC initiating device hardware.

In the embodiments, the RPC initiating device can publish the RPC message to the first predetermined message path of the service-side, so that the called device obtains the RPC message from the first predetermined message path. Similarly, the called device can publish the response message with respect to the RPC message to the second predetermined message path of the service-side, so that the RPC initiating device can obtain the response message from the second predetermined message path. By publishing the RPC message and the response message to different message paths of the service-side, the decoupling of the RPC message and the response message is achieved with high usability.

In some optional embodiments, the RPC initiating device needs to obtain the response message from the service-side after detecting the presence of the response message with respect to the RPC message on the service-side.

In an example, the RPC initiating device may use an RPC manner to obtain the response message from the second predetermined message path of the service-side. Specifically, the RPC initiating device can call a subroutine on the service-side to obtain the response message, where the called subroutine on the service-side can provide the RPC initiating device with a content of the desired message.

In another example, the RPC initiating device may initiate a request to obtain the response message from the second predetermined message path of the service-side. The service-side sends the response message to the RPC initiating device according to the request.

In the embodiments, the RPC initiating device may get the desired response message from the service-side timely by using the RPC manner, which realizes synchronous RPC between devices.

In some optional embodiments, an RPC message may be used to instruct the called device to execute a remote control command. Correspondingly, the response message is used to indicate an execution result acquired by the called device executing the remote control command. The remote control command may include, but is not limited to, at least one of the following: a remote door opening command, a remote door closing command, a remote image acquisition and reporting command, a remote device start command, and a remote device shutdown command. The execution result may indicate success or failure of the called device executing the remote control command.

The RPC message may also be used to instruct the called device to perform vision task processing. Correspondingly, the response message is used to indicate a processing result acquired by the called device performing the vision task processing. A vision task may include, but is not limited to, at least one of the following: face recognition, face database search, face matching, etc. The processing result may be used to indicate a result of the vision task analysis and processing. For example, if the vision task processing includes face recognition, the processing result may indicate a result of the face recognition. Thus, an RPC initiating device can invoke capabilities of a remote called device to perform a corresponding task, thereby enhancing the flexibility of task processing.

In the embodiments, when direct communication between devices is not possible, it is possible to achieve a purpose of controlling the called device to execute remote control command and/or vision task processing in real-time by the RPC initiating device through the interaction between the RPC initiating device and the service-side, and the interaction between the called device and the service-side. The RPC initiating device can obtain in real-time the execution result acquired by the called device executing the remote control command and/or the processing result acquired by the called device executing the vision task processing process. As a result, capabilities of the remote device can be used to complete local commands or tasks, and more flexible deployment of device resources and capabilities can be realized.

Figure 4:
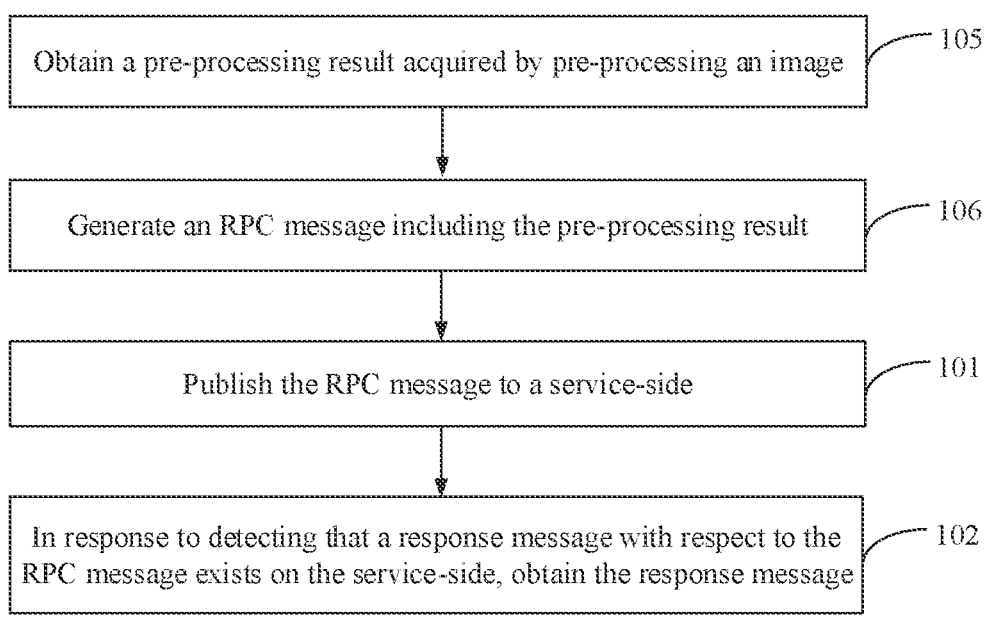
FIG. 4 is a flowchart illustrating an information interaction method according to yet another exemplary embodiment of the present disclosure.

In some optional embodiments, as shown in FIG. 4, the method may further include steps 105 and 106.

At step 105, a pre-processing result acquired by pre-processing an image is obtained.

In an example, the image may include, but is not limited to, at least one image collected by a camera. The pre-processing may include, but is not limited to, at least one of the following: cropping the image, adjusting a size of the image, identifying a key region in the image, and extracting feature information of the image. The key region may be a region such as a human face, a human body, and so on. The pre-processing result may include, but is not limited to, a remote control command executed by the called device and/or feature information required for vision task processing. For example, the vision task processing is face recognition, and the feature information includes, but is not limited to, face feature information obtained by feature extraction on the image.

At step 106, an RPC message including the pre-processing result is generated.

In the embodiments of the present disclosure, the RPC initiating device may pre-process the image, and generate the RPC message based on the pre-processing result.

In one example, the RPC initiating device needs to obtain a final processing result of the image, and this final processing result is to be obtained based on the capability of the called device. To improve the processing efficiency of the called device, the image can be pre-processed first at the RPC initiating device, so as to obtain the pre-processing result. The pre-processing result includes, but is not limited to, intermediate data required in a process of obtaining the final processing result by the called device. For example, the final processing result includes a face recognition result, and the RPC initiating device may first pre-process the image, where the pre-processing includes, but is not limited to, extracting face feature information from the image and taking the face feature information as the pre-processing result. Thus, the called device can quickly perform face recognition directly based on the face feature information and obtain the final processing result.

In the embodiments, the image can be pre-processed at the RPC initiating device in advance, thereby generating an RPC message including the pre-processing result. In this way, the called device can process directly based on the pre-processing result, shortening the time for the called devices to get the response message, and further satisfying the demand of real-time service collaboration between devices when the devices cannot communicate directly with each other.

Figure 5:
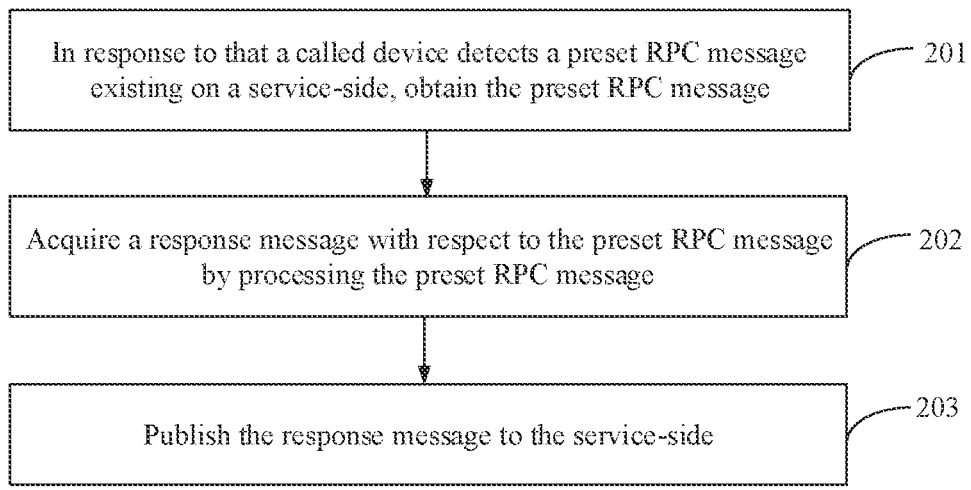
FIG. 5 is a flowchart illustrating an information interaction method according to yet another exemplary embodiment of the present disclosure.

As shown in FIG. 5, which illustrates an information interaction method according to another exemplary embodiment. The method can be used for a called device, where the called device includes, but is not limited to, any device in the IoT that is different from an RPC initiating device, and the called device is a device to be called as indicated in an RPC message published by the RPC initiating device. The called device and the service-side can communicate with each other over a network, and the called device cannot directly communicate with the RPC initiating device. The information interaction method provided by the present disclosure may include the following steps.

At step 201, in response to that the called device detects a preset RPC message existing on the service-side, the preset RPC message is obtained.

In the embodiments of the present disclosure, the preset RPC message includes information indicating the called device. For example, when the RPC initiating device publishes an RPC message, the RPC initiating device can add information such as device identification of the called device to the RPC message. Each device can monitor the service-side, and once the device listens to a presence of a certain RPC message published by the RPC initiating device on the service-side, the device can determine whether the RPC message is a preset RPC message corresponding to the device. When the RPC message is the preset RPC message corresponding to a specific device, the preset PRC message is obtained by the specific device.

At step 202, a response message with respect to the preset RPC message is acquired by processing the preset RPC message.

At step 203, the response message is published to the service-side.

In the embodiment, the called device indicated in the preset RPC message can obtain the preset RPC message from the service-side when the called device detects that the preset RPC message exists on the service-side, so as to process the preset RPC message and publish the obtained response message to the service-side. Thus, the RPC initiating device obtains the response message from the service-side. In a case where direct communication between devices is not possible, a real-time RPC between devices are realized.

In some optional embodiments, each device may monitor a first predetermined message path of the service-side, and if a preset RPC message is detected in the first predetermined message path, the preset RPC message may be obtained by a called device indicated in the preset RPC message. The first predetermined message path is a predetermined path used by the service-side to store the RPC message published by the RPC initiating device.

Correspondingly, after generating the response message, the called device can publish the response message to a second predetermined message path of the service-side, such that the RPC initiating device obtains the response message from the second predetermined message path. The second predetermined message path is a predetermined path used by the service-side to store the response message corresponding to the RPC message, where the RPC message is issued by the RPC initiating device.

In the embodiment, the called device can obtain an RPC message from the first predetermined message path of the service-side, and publish the acquired response message to the second predetermined message path of the service-side, so as to realize the decoupling of the RPC message and the response message with high usability.

Figure 6:
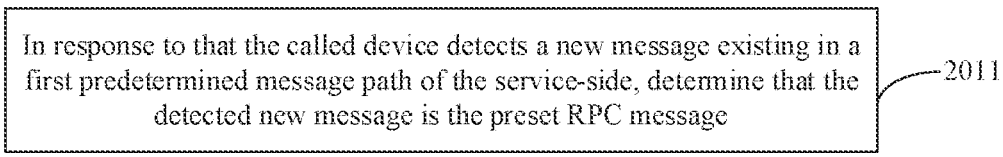
FIG. 6 is a flowchart illustrating an information interaction method according to yet another exemplary embodiment of the present disclosure.

In some optional embodiments, as shown in FIG. 6, the above step 201 may further include step 2011.

At step 2011, in response to that the called device detects a new message existing in a first predetermined message path of the service-side, it is determined that the detected new message is the preset RPC message.

In the embodiments of the present disclosure, the called device may determine that the detected new message is the preset RPC message when the called device detects that there is a new message in the first predetermined message path of the service-side.

In the embodiments, the called device can determine a presence of a preset RPC message by monitoring a new message in the first predetermined message path of the service-side, and the called device can subsequently obtain this RPC message, which is simple and high availability.

In some optional embodiments, the called device obtains the RPC message in a manner that may be similar to the manner in which the RPC initiating device obtains the response message, e.g., by using an RPC manner, a request manner, etc.

In the embodiments, the called device can obtain the RPC message from the service-side, which makes better real-time information interaction between devices and meets the demand for real-time service collaboration between devices.

Figure 7:
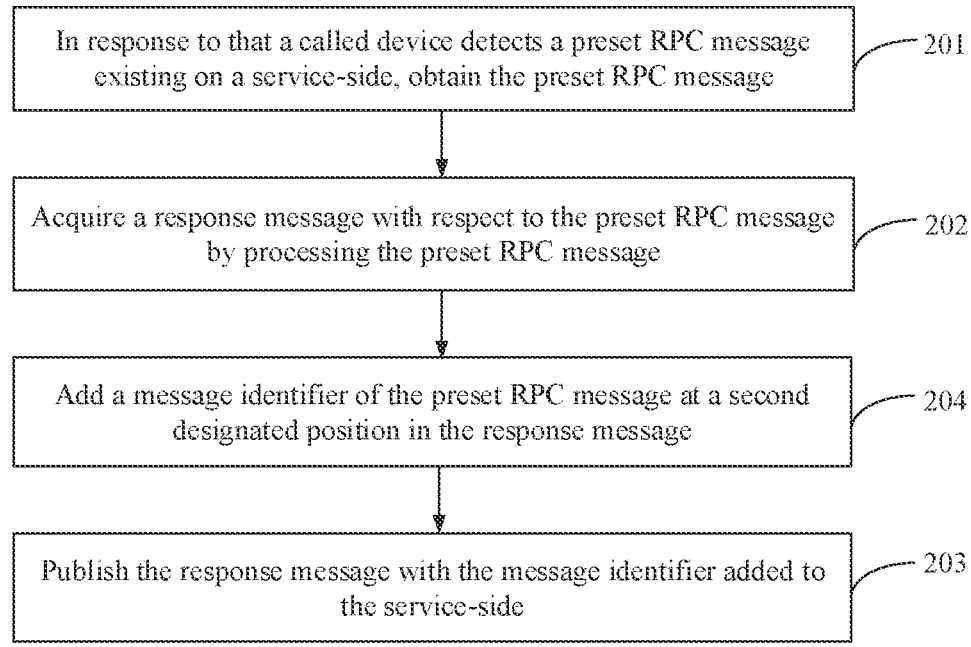
FIG. 7 is a flowchart illustrating an information interaction method according to yet another exemplary embodiment of the present disclosure.

In some optional embodiments, the preset RPC message includes a message identifier of the preset RPC message. Accordingly, as shown in FIG. 7, the above method may further include step 204.

At step 204, the message identifier of the preset RPC message is added at a second designated position in the response message.

The second designated position includes, but is not limited to, a position of the header of the response message.

In the embodiments of the present disclosure, the called device can add the message identifier of the preset RPC message to the second designated position in the response message when generating the response message, such that the RPC initiating device can associate the published RPC message with the response message according to the message identifier. Correspondingly, at step 203, the called device may publish, to the service-side, the response message with the message identifier added.

In the embodiments, the called device may add the message identifier of the preset RPC message at the second designated position in the response message, so that the RPC initiating device subsequently corresponds the response message to the previously published RPC message according to the message identifier, which has high availability.

In some optional embodiments, the preset RPC message may be published by the RPC initiating device to the service-side based on a preset asynchronous messaging protocol. The preset asynchronous messaging protocol may be the MQTT protocol.

When the called device issues the response message to the service-side, the called device can also publish the message based on the preset asynchronous messaging protocol. Similarly, the preset asynchronous messaging protocol may be the MQTT protocol.

In the embodiments, the RPC initiating device and/or called device can publish messages based on the preset asynchronous messaging protocol, and RPC synchronous invocation based on asynchronous messages is achieved with ease of implementation and high availability.

In some optional embodiments, the RPC initiating device publishes a preset RPC message to the first predetermined message path of the service-side. When the called device publishes the response message to the service-side, the called device publishes the response message to the second predetermined message path of the service-side. The first predetermined message path and/or the second predetermined message path of the service-side includes identification information of the RPC initiating device that publishes the preset RPC message.

In the embodiments, the called device can obtain the preset RPC message issued by the RPC initiating device from the first predetermined message path of the service-side including the identification information of the RPC initiating device, and can also publish the response message to the second predetermined message path of the service-side including the identification information of the RPC initiating device. When direct communication between devices is not possible, the method realizes the purpose of real-time remote procedure call for information between devices and meets the demand of real-time service collaboration between devices.

In some optional embodiments, a preset RPC message may be used to instruct the called device to execute a remote control command. Accordingly, the called device may execute the remote control command according to instruction in the preset RPC message, and acquire an execution result. Then, based on the execution result, a response message including the execution result is obtained.

The remote control command may include, but is not limited to, at least one of the following: a remote door opening command, a remote door closing command, a remote image acquisition and reporting command, a remote device start command, and a remote device shutdown command. The execution result may include success or failure in executing the remote control command.

In some optional embodiments, a preset RPC message may be used to instruct the called device to perform vision task processing. Correspondingly, the called device may perform the vision task processing according to instruction in the preset RPC message, and acquire a processing result. Based on the processing result, a response message is obtained. A vision task may include, but is not limited to, at least one of the following: face recognition, face database search, face matching, etc.

In some optional embodiments, a preset RPC message includes a pre-processing result obtained by pre-processing an image, then the called device can process the pre-processing result, and acquire a response message. For example, the pre-processing result includes face feature information, and the preset RPC message is used to instruct the called device to perform face recognition. The called device can directly compare the face feature information in a face feature information database based on the face feature information, so as to obtain a face recognition result.

In the embodiments, the RPC initiating device may pre-process the image, and then generate the preset RPC message. The called device may directly execute a remote control command and/or vision task processing on the pre-processing result, which has high availability.

Figure 8:
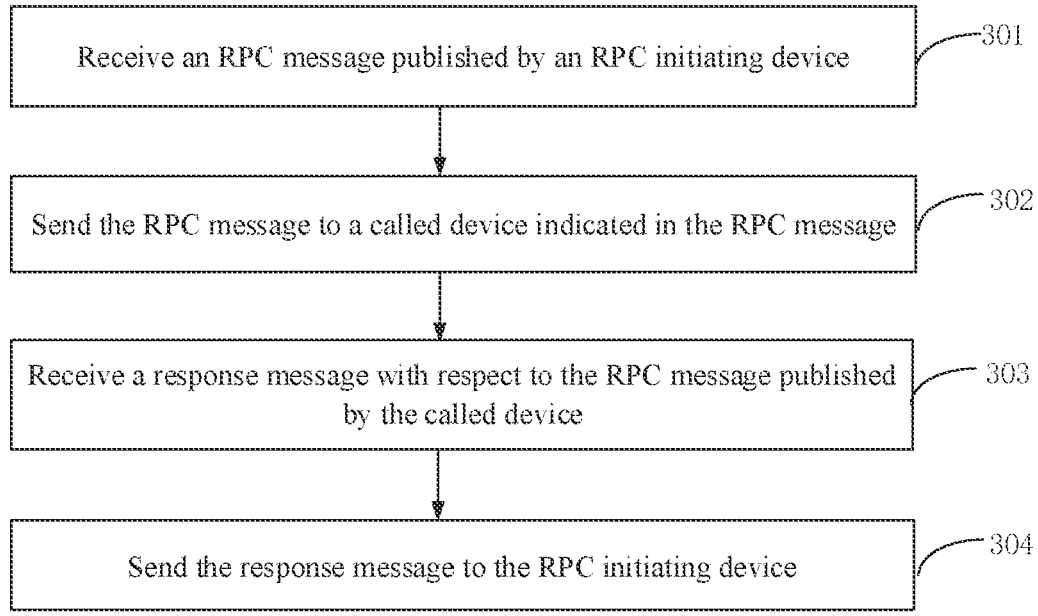
FIG. 8 is a flowchart illustrating an information interaction method according to yet another exemplary embodiment of the present disclosure.

FIG. 8 illustrates an information interaction method according to another exemplary embodiment. The method can be used on a service-side, where the service-side can be a server adopted the MQTT protocol, including but not limited to an MQTT Broker. The information interaction method provided by the present disclosure may include the following steps.

At step 301, an RPC message published by an RPC initiating device is received.

At step 302, the RPC message is sent to a called device indicated in the RPC message.

At step 303, a response message with respect to the RPC message published by the called device is received.

The response message is acquired by the called device after the called device detects the RPC message at the service-side and processes the RPC message.

At step 304, the response message is sent to the RPC initiating device.

In the embodiment, the service-side can receive the RPC message issued by the RPC initiating device, such that the called device can obtain the RPC message. Moreover, the service-side can receive the response message with respect to the RPC message issued by the called device, such that the RPC initiating device can obtained the response message. In the case where direct communication between devices is not possible, the service-side serves as an intermediary to achieve the purpose of real-time remote procedure call for information between devices and to meet the demand of real-time service collaboration between devices.

In some optional embodiments, the RPC initiating device publishes the RPC message to a first predetermined message path of the service-side, and the called device publishes the response message to a second predetermined message path of the service-side. The first predetermined message path and/or the second predetermined message path includes identification information of a device published the RPC message.

In the embodiments, through different message paths, the RPC initiating device and the called device respectively publish messages to different message paths, which realizes the decoupling of the RPC message and the response message, and has high availability.

In some optional embodiments, the RPC initiating device may publish the RPC message to the service-side based on a preset asynchronous messaging protocol, and the called device may also publish the response message with respect to the RPC message to the service-side based on the preset asynchronous messaging protocol. And the service-side supports the preset asynchronous messaging protocol.

The preset asynchronous messaging protocol includes, but is not limited to, the MQTT protocol.

In the embodiments, by the service-side supporting the preset asynchronous messaging protocol as an intermediary between devices that cannot communicate directly, the RPC synchronous invocation based on the asynchronous messaging protocol is realized. When the devices cannot directly communicate with each other, the method realizes the purpose of real-time remote procedure call for information between devices and meets the demand of real-time service collaboration between devices.

Figure 9:
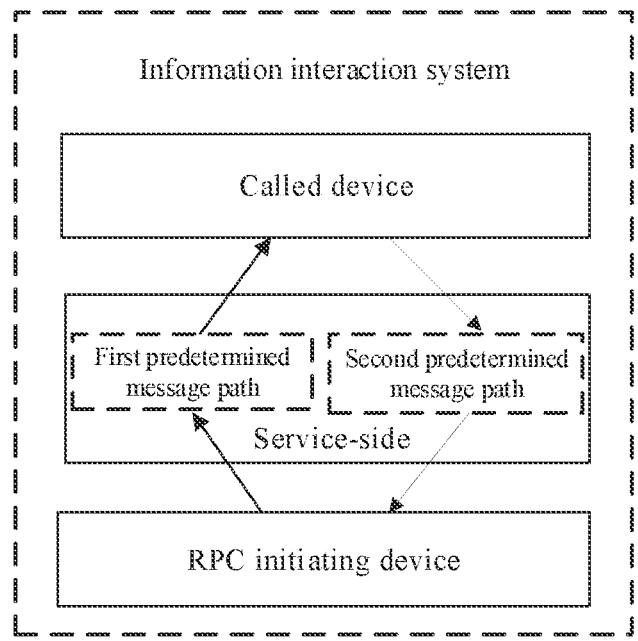
FIG. 9 is a schematic diagram illustrating an information interaction system according to an exemplary embodiment of the present disclosure.

In some embodiments, an information interaction system is also provided. As shown in FIG. 9, which illustrates an information interaction system according to an exemplary embodiment. The system can include: an RPC initiating device, a called device and a service-side.

The RPC initiating device can connect with the service-side through a network, and the called device can connect with the service-side through a network, but the called device cannot connect directly with the RPC initiating device through a network. The RPC initiating device may subscribe to a message in a second predetermined message path of the service-side in advance, and the called device may subscribe to a message in a first predetermined message path of the service-side in advance. The first predetermined message path is a predetermined path used by the service-side to store an RPC message published by the RPC initiating device, and the second predetermined message path is a predetermined path used by the service-side used to store a response message corresponding to the RPC message, where the RPC message is published by the RPC initiating device. The service-side supports an asynchronous messaging protocol.

Figure 10:
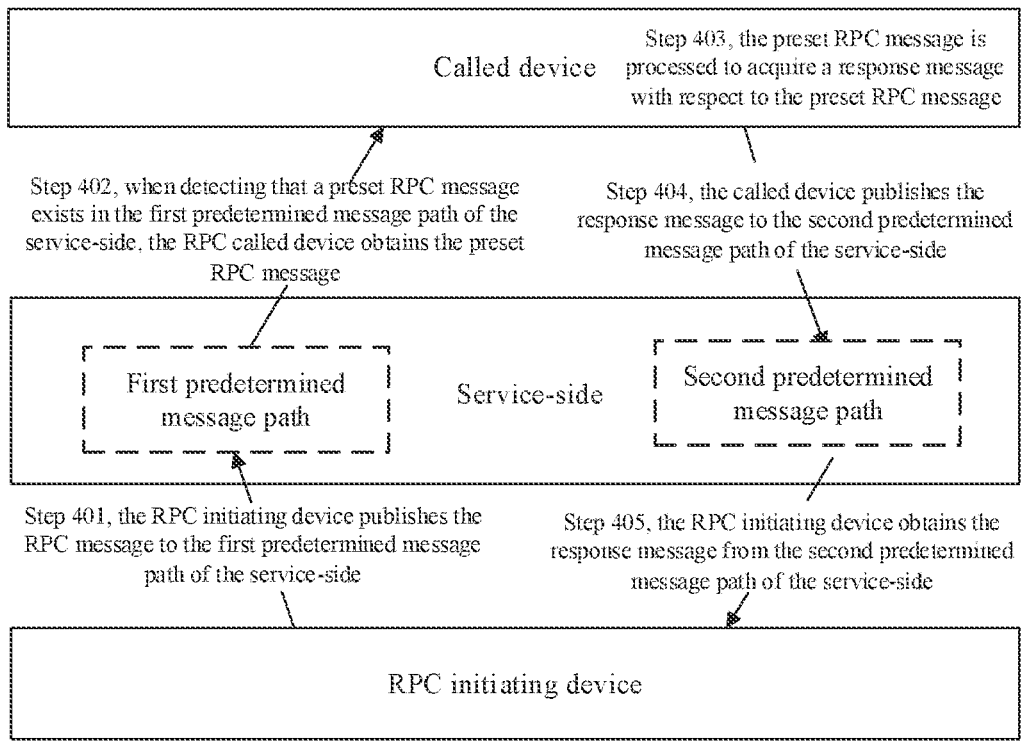
FIG. 10 is a flowchart illustrating an information interaction method according to yet another exemplary embodiment of the present disclosure.

Further, as shown in FIG. 10, the information interaction method among devices in the information interaction system can include the following steps.

At step 401, the RPC initiating device publishes the RPC message to the first predetermined message path of the service-side.

In the embodiments of the present disclosure, a message identifier of the RPC message is added to a first designated position in the RPC message.

At step 402, when detecting that a preset RPC message exists in the first predetermined message path of the service-side, the RPC called device obtains the preset RPC message.

At step 403, the called device processes the preset RPC message to acquire a response message with respect to the preset RPC message.

At step 404, the called device publishes the response message to the second predetermined message path of the service-side.

A message identifier of the preset RPC message is added to a second designated position in the response message.

At step 405, when detecting that a new message exists in the second predetermined message path of the service-side, the RPC initiating device obtains the response message from the second predetermined message path of the service-side.

In response to listening to the presence of a new message in the second predetermined message path of the service-side, the RPC initiating device may get this message from the second predetermined message path. And according to the message identifier added in the new message, the RPC initiating device determines a response message of which RPC message associating with the new message. In the embodiment, the RPC initiating device can publish the RPC message to the service-side. After the called device detects the RPC message at the service-side, the called device obtains the RPC message, processes the RPC message, and generates the response message. Further, the called device publishes the response message to the service-side. The RPC initiating device also obtains the response message from the service-side. Thus, the RPC synchronous invocation based on the asynchronous messaging protocol is realized. Moreover, the RPC message and the response message are published in different message paths, which realizes the decoupling of the two messages. In addition, the RPC message and the response message can be corresponded one by one through the message identifier of the RPC message. Thus, in the case that direct communication between devices is not possible, the purpose of real-time remote procedure call for information between devices is realized.

Taking an access control scenario as an example, the information interaction method shown in FIG. 10 is further described as follows. In this scenario, the RPC initiating device may be a remote control device, including but not limited to a handheld terminal, a remote computer, etc., the called device may be an access control device, and the service-side may be an MQTT Broker.

The remote control device publishes, to a first predetermined message path of the service-side, an RPC message for instructing the access control device to execute a remote door opening command, and the RPC message includes a message identifier of the RPC message. Multiple devices can keep monitoring the first predetermined message path of the service-side. When a new message is detected in the first predetermined message path, a called device, e.g., the access control device, indicated by the new message, e.g., the RPC message, obtains the RPC message from the first predetermined message path of the service-side and performs a remote door opening operation. If the door is opened successfully, the access control device publishes, to a second predetermined message path of the service-side, a response message with respect to the RPC message indicating the success of remote door opening, and the response message includes the message identifier of the RPC message. The remote control device monitors the second predetermined message path of the service-side. When a new message is detected in the second predetermined message path, and the message identifier of the RPC message is added to the new message, the remote control device determines that the new message is a response message associated with the previous RPC message. The remote control device obtains the response message from the second predetermined message path of the service-side, and then the remote control device can determine that the access control device has successfully opened the door.

If the access control device fails to open the door, after obtaining a corresponding response message, the remote control device can re-open the door or troubleshoot a problem with the access control device.

Next, taking a face recognition scenario as an example, the information interaction method shown in FIG. 10 is further explained as follows. In this scenario, the RPC initiating device may be a remote control device, including but not limited to a handheld terminal, a remote computer, etc., or the RPC initiating device may be a monitoring device installed in various scenarios for capturing face images and extracting face feature information from the face images. The called device may be a face feature database, and the service-side may be an MQTT Broker.

After the remote control device captures an image through a camera, the remote control device can pre-process the image to obtain a pre-processing result including face feature information in the image, and generate an RPC message based on the pre-processing result. The remote control device sends the RPC message to a first predetermined message path of the service-side. After the face feature database monitors and obtains the RPC message from the service-side, the face feature database performs face recognition based on the face feature information therein, and obtains a face recognition result, so as to generate a response message including the face recognition result. The face feature database publishes the response message to a second predetermined message path of the service-side. After obtaining the response message, the remote control device gets the face recognition result. In this process, a message identifier of the RPC message may also be added in the RPC message and the corresponding response message.

In the embodiments, the RPC synchronous invocation based on the asynchronous messaging protocol is realized. Moreover, the RPC message and the response message are published in different message paths, which realizes the decoupling of the two messages. In addition, the RPC message and the response message can be corresponded one by one through the message identifier of the RPC message. Thus, in the case that direct communication between devices is not possible, the purpose of real-time remote procedure call for information between devices is realized.

Figure 11:
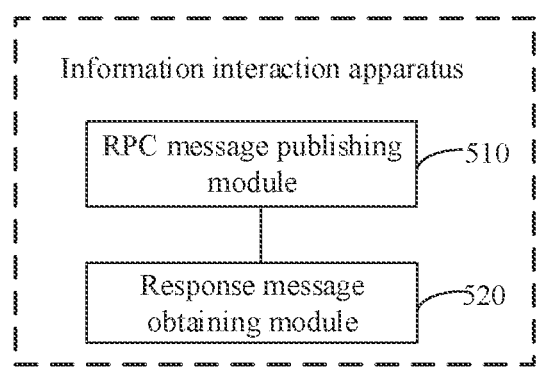
FIG. 11 is a block diagram illustrating an information interaction apparatus according to an exemplary embodiment of the present disclosure.

Corresponding to the aforementioned method embodiments, the present disclosure also provides apparatus embodiments. As shown in FIG. 11, which is a block diagram illustrating an information interaction apparatus according to an exemplary embodiment of the present disclosure. The apparatus includes: an RPC message publishing module 510, configured to publish an RPC message to a service-side; and a response message obtaining module 520, configured to obtain a response message with respect to the RPC message in response to detecting that the response message exists on the service-side, where the response message is published to the service-side by a called device indicated in the RPC message, and the response message is acquired by the called device processing the RPC message after detecting the RPC message at the service-side.

In some optional embodiments, the apparatus further includes: a first identifier adding module, configured to add a message identifier of the RPC message at a first designated position in the RPC message; and the RPC message publishing module includes a first publishing submodule configured to publish the RPC message with the message identifier added to the service-side.

In some optional embodiments, message identifiers of different RPC messages are different, and the message identifiers of respective RPC messages belong to a monotonically increasing sequence.

In some optional embodiments, the apparatus further includes: a first determining module, configured to, in response to detecting that a new message exists in a second predetermined message path of the service-side, and the new message has the message identifier of the RPC message, determine that the detected new message is the response message with respect to the RPC message.

In some optional embodiments, the response message is published to the service-side by the called device based on a preset asynchronous messaging protocol; and/or the RPC message publishing module includes a second publishing submodule, configured to publish the RPC message to the service-side based on the preset asynchronous messaging protocol.

In some optional embodiments, the RPC message publishing module includes a third publishing submodule configured to publish to a first predetermined message path of the service-side; and the response message obtaining module includes a first obtaining submodule, configured to, in response to detecting that the response message with respect to the RPC message exists in a second predetermined message path of the service-side, obtain the response message.

In some optional embodiments, the first predetermined message path of the service-side and/or the second predetermined message path of the service-side includes identification information of a device published the RPC message.

In some optional embodiments, the RPC message instructs the called device to execute a remote control command, and the response message indicates an execution result acquired by the called device executing the remote control command; or the RPC message instructs the called device to perform vision task processing, and the response message indicates a processing result acquired by the called device performing the vision task processing.

In some optional embodiments, the apparatus further includes: a pre-processing result obtaining module, configured to obtain a pre-processing result acquired by pre-processing an image; and an RPC message generating module, configured to generate the RPC message including the pre-processing result.

Figure 12:
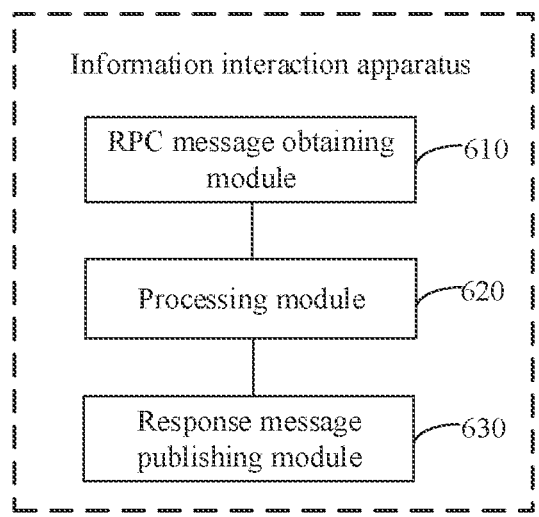
FIG. 12 is a block diagram illustrating an information interaction apparatus according to another exemplary embodiment of the present disclosure.

As shown in FIG. 12, which is a block diagram illustrating an information interaction apparatus according to an exemplary embodiment of the present disclosure. The apparatus includes: an RPC message obtaining module 610, configured to obtain a preset RPC message in response to detecting the preset RPC message existing on a service-side, where the preset RPC message includes information indicating the called device; a processing module 620, configured to acquire a response message with respect to the preset RPC message by processing the preset RPC message; and a response message publishing module 630, configured to publish the response message to the service-side.

In some optional embodiments, the apparatus further includes: a second determining module, configured to, in response to that the called device detects a new message existing in a first predetermined message path of the service-side, determine that the detected new message is the preset RPC message, and/or the response message publishing module includes a fourth publishing submodule, configured to publish the response message to a second predetermined message path of the service-side.

In some optional embodiments, the preset RPC message includes a message identifier of the preset RPC message; the apparatus further includes: a second identifier adding module, configured to add the message identifier of the preset RPC message at a second designated position of the response message; and the response message publishing module includes a fifth publishing submodule configured to publish the response message with the message identifier added to the service-side.

In some optional embodiments, the preset RPC message is published by an RPC initiating device to the service-side based on a preset asynchronous messaging protocol; and/or the response message publishing module includes a sixth publishing submodule, configured to publish the response message to the service-side based on the preset asynchronous messaging protocol.

In some optional embodiments, a first predetermined message path of the service-side and/or a second predetermined message path of the service-side includes identification information of an RPC initiating device published the preset RPC message; and/or the preset RPC message instructs the called device to execute a remote control command or perform vision task processing.

Figure 13:
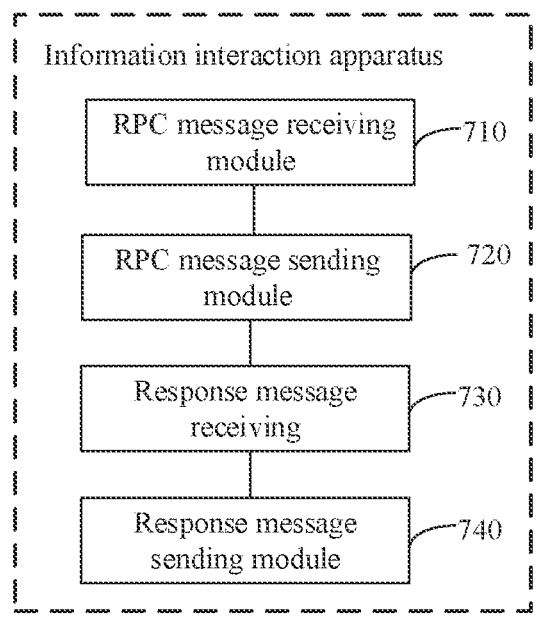
FIG. 13 is a block diagram illustrating an information interaction apparatus according to still another exemplary embodiment of the present disclosure.

As shown in FIG. 13, which is a block diagram illustrating an information interaction apparatus according to an exemplary embodiment of the present disclosure. The apparatus includes: an RPC message receiving module 710, configured to receive an RPC message published by an RPC initiating device; an RPC message sending module 720, configured to send the RPC message to a called device indicated in the RPC message; a response message receiving module 730, configured to receive a response message with respect to the RPC message published by the called device, where the response message is acquired by the called device after the called device detects the RPC message at the service-side and processes the RPC message; and a response message sending module 740, configured to send the response message to the RPC initiating device.

In some optional embodiments, the RPC message receiving module includes a first receiving submodule, configured to receive the RPC message published by the RPC initiating device to a first predetermined message path; and the response message receiving module includes a second receiving submodule, configured to receive the response message published by the called device to a second predetermined message path.

In some optional embodiments, the RPC message receiving module includes a third receiving submodule, configured to the RPC message published by the RPC initiating device based on a preset asynchronous messaging protocol; and the response message receiving module includes a fourth receiving submodule, configured to receive the response message published by the called device based on the preset asynchronous messaging protocol.

In some optional embodiments, the first predetermined message path and/or the second predetermined message path includes identification information of a device published the RPC message.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

Embodiments of the present disclosure further provide a computer-readable storage medium, the storage medium stores a computer program, and the computer program is configured to execute any one of the information interaction methods described above. The computer readable storage medium may be a non-volatile storage medium.

In some optional embodiments, the present disclosure provides a computer program product, including computer-readable codes, and when the computer-readable codes run on a device, a processor in the device executes the information interaction method provided by any one of the above embodiments.

In some optional embodiments, the present disclosure also provides another computer program product, which stores computer-readable instructions. When running the instructions, the computer is caused to execute the information interaction method provided by any one of the above embodiments.

The computer program product may be specifically implemented in hardware, software, or a combination thereof. In an optional embodiment, the computer program product is embodied as a computer storage medium, and in another optional embodiment, the computer program product is embodied as a software product, for example, a software development kit (SDK), etc.

Embodiments of the present disclosure further provide an information interaction device. The device includes: a processor and a memory for storing instructions executable by the processor. The processor is configured to invoke the instructions stored in the memory to implement any one of the information interaction methods described above.

Figure 14:
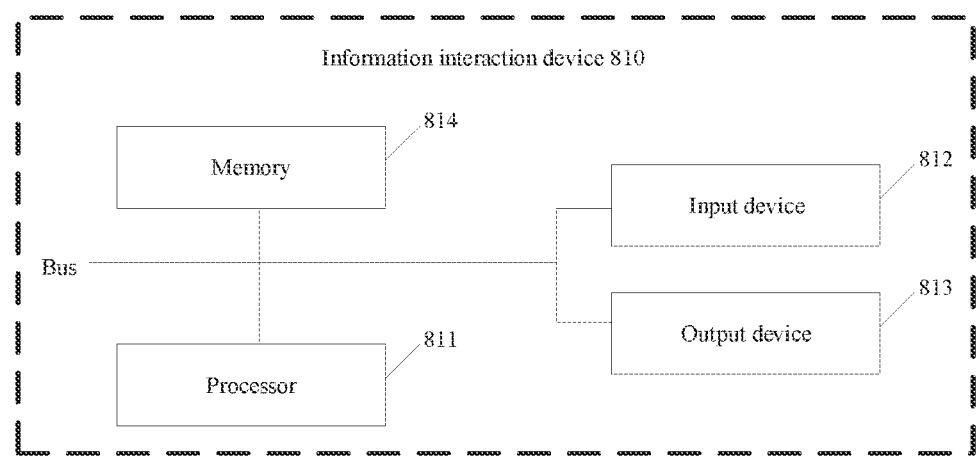
FIG. 14 is a schematic structural diagram illustrating an information interaction device according to an exemplary embodiment of the present disclosure.

FIG. 14 is a schematic structural diagram illustrating an information interaction device according to an embodiment of the present disclosure. An information interaction device 810 includes a processor 811 and a memory 814, and may also include an input device 812 and an output device 813. The input device 812, output device 813, memory 814 and processor 811 are connected to each other through a bus.

The memory includes, but is not limited to, a random access memory (RAM), a read-only memory (ROM), an erasable programmable read only memory (EPROM), or a compact disc read-only memory (CD-ROM), which is used for storing associated instructions and data.

The input device is used to input data and/or signals, and the output device is used to output data and/or signals. The output device and the input device may be separate devices or may be an integral device.

The processor may include one or more processors, such as one or more central processing units (CPUs). In the case where the processor is a CPU, the CPU may be a single-core CPU or a multi-core CPU.

The memory is used to store a program code and data of the device.

The processor is used to invoke the program code and data in the memory to perform the steps in the method embodiment described above. The details can be found in the description in the method embodiments and will not be repeated herein.

It can be understood that FIG. 14 only shows a simplified design of an information interaction device. In a practical application, the information interaction device may further include necessary other elements, including but not limited to any number of input/output devices, processors, controllers, memories, etc., and all information interaction devices that can implement the embodiments of the present disclosure are within the scope of protection of the present disclosure.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

The above description is merely exemplary embodiments of the present disclosure, and is not intended to limit the present disclosure. Any modifications, equivalent replacements, improvements, etc., made within the spirit and principle of the present disclosure should be included within the scope of protection of the present disclosure.

The invention claimed is:

1. An information interaction method, comprising:
publishing, by an RPC initiating device, a remote procedure call (RPC) message to a service-side based on a preset asynchronous messaging protocol, wherein the preset asynchronous messaging protocol comprises a message queuing telemetry transport (MQTT) protocol; and
in response to detecting that a response message with respect to the RPC message exists on the service-side, obtaining, by the RPC initiating device, the response message,
wherein the response message is published to the service-side by a called device indicated in the RPC message based on the preset asynchronous messaging protocol, and the response message is acquired by the called device processing the RPC message after detecting the RPC message at the service-side.

2. The method of claim 1, further comprising:
adding a message identifier of the RPC message at a first designated position in the RPC message; and
wherein publishing the RPC message to the service-side comprises:
publishing the RPC message with the message identifier added to the service-side.

3. The method of claim 2, further comprising:
in response to detecting that a new message exists in a second predetermined message path of the service-side, and the new message has the message identifier of the RPC message, determining that the detected new message is the response message with respect to the RPC message.

4. The method of claim 1, wherein
publishing the RPC message to the service-side comprises:
publishing the RPC message to a first predetermined message path of the service-side; and
obtaining the response message in response to detecting that the response message with respect to the RPC message exists on the service-side comprises:
in response to detecting that the response message with respect to the RPC message exists in a second predetermined message path of the service-side, obtaining the response message.

5. The method of claim 4, wherein at least one of the first predetermined message path of the service-side or the second predetermined message path of the service-side comprises identification information of the RPC initiating device published the RPC message.

6. The method of claim 1, wherein
the RPC message instructs the called device to execute a remote control command, and the response message indicates an execution result acquired by the called device executing the remote control command; or
the RPC message instructs the called device to perform vision task processing, and the response message indicates a processing result acquired by the called device performing the vision task processing.

7. The method of claim 1, comprising:
after publishing the RPC message to the service-side, monitoring the service-side in real-time to detect a presence of the response message with respect to the RPC message on the service-side.

8. The method of claim 1, wherein obtaining the response message comprises one of:
calling a subroutine on the service-side to obtain the response message, wherein the called subroutine on the service-side is configured to provide a content of a particular message, or
initiating a request to obtain the response message to the service-side and receiving the response message sent by the service-side in response to the request.

9. An information interaction method, comprising:
in response to detecting, by a called device, a preset RPC message existing on a service-side, obtaining the preset RPC message by the called device, wherein the preset RPC message comprises information indicating the called device;
acquiring, by the called device, a response message with respect to the preset RPC message by processing the preset RPC message; and
publishing, by the called device, the response message to the service-side,
wherein the preset RPC message is published by an RPC initiating device to the service-side based on a preset asynchronous messaging protocol, wherein the preset asynchronous messaging protocol comprises a message queuing telemetry transport (MQTT) protocol, and
wherein publishing the response message to the service-side comprises: publishing the response message to the service-side based on the preset asynchronous messaging protocol.

10. The method of claim 9, comprising at least one of:
in response to detecting, by the called device, a new message existing in a first predetermined message path of the service-side, determining that the detected new message is the preset RPC message; or publishing the response message to a second predetermined message path of the service-side.

11. The method of claim 9, wherein the preset RPC message comprises a message identifier of the preset RPC message;

the method further comprises:
adding the message identifier of the preset RPC message at a second designated position of the response message; and wherein publishing the response message to the service-side comprises:
publishing the response message with the message identifier added to the service-side.

12. The method of claim 9, wherein at least one of a first predetermined message path of the service-side or a second predetermined message path of the service-side comprises identification information of an RPC initiating device published the preset RPC message; and the preset RPC message instructs the called device to execute a remote control command or perform vision task processing.

13. The method of claim 9, comprising:

monitoring the service-side and listening to a presence of an RPC message published by an RPC initiating device on the service-side; and determining whether the RPC message is the preset RPC message by determining whether the RPC message corresponds to the called device.

14. An information interaction method, comprising:

receiving, by a service-side, an RPC message published by an RPC initiating device;

sending, by the service-side, the RPC message to a called device indicated in the RPC message;

receiving, by the service-side, a response message with respect to the RPC message published by the called device, wherein the response message is acquired by the called device after the called device detects the RPC message at the service-side and processes the RPC message; and sending, by the service-side, the response message to the RPC initiating device, wherein receiving, by the service-side, the RPC message published by the RPC initiating device comprises:
receiving, by the service-side, the RPC message published by the RPC initiating device based on a preset asynchronous messaging protocol, wherein the preset asynchronous messaging protocol comprises a message queuing telemetry transport (MQTT) protocol, and wherein receiving, by the service-side, the response message with respect to the RPC message published by the called device comprises:
receiving, by the service-side, the response message published by the called device based on the preset asynchronous messaging protocol.

15. The method of claim 14, wherein receiving, by the service-side, the RPC message published by the RPC initiating device comprises:
receiving, by the service-side, the RPC message published by the RPC initiating device to a first predetermined message path; and receiving, by the service-side, the response message with respect to the RPC message published by the called device comprises:
receiving, by the service-side, the response message published by the called device to a second predetermined message path.

16. The method of claim 15, wherein at least one of the first predetermined message path or the second predetermined message path comprises identification information of a device published the RPC message.

* * * * *